United States Patent
Watanabe et al.

(10) Patent No.: US 7,626,303 B2
(45) Date of Patent: Dec. 1, 2009

(54) STATOR FOR INNER ROTOR TYPE MOLD BRUSHLESS MOTOR

(75) Inventors: Koji Watanabe, Sisou (JP); Toshio Shindo, Sisou (JP)

(73) Assignee: Ichinomiya Denki Co., Ltd., Hyogo (JP)

( * ) Notice: Subject to any disclaimer, the term of this patent is extended or adjusted under 35 U.S.C. 154(b) by 208 days.

(21) Appl. No.: 11/999,163

(22) Filed: Dec. 4, 2007

(65) Prior Publication Data

US 2008/0157610 A1    Jul. 3, 2008

(30) Foreign Application Priority Data

Dec. 28, 2006   (JP)   .............................. 2006-356044

(51) Int. Cl.
*H02K 1/00* (2006.01)

(52) U.S. Cl. .................. 310/216; 310/208; 310/194

(58) Field of Classification Search ......... 310/216–218, 310/208, 194, 71, 258–259
See application file for complete search history.

(56) References Cited

U.S. PATENT DOCUMENTS

| 6,700,282 | B2 * | 3/2004 | Mori et al. | 310/208 |
|---|---|---|---|---|
| 6,794,786 | B2 * | 9/2004 | Enomoto et al. | 310/216.088 |
| 7,126,246 | B2 * | 10/2006 | Izumi et al. | 310/208 |
| 7,188,403 | B2 * | 3/2007 | Yamamoto et al. | 29/605 |
| 2003/0098628 | A1 * | 5/2003 | Enomoto et al. | 310/218 |
| 2003/0127935 | A1 * | 7/2003 | Mori et al. | 310/206 |
| 2004/0051417 | A1 * | 3/2004 | Yamazaki et al. | 310/216 |
| 2005/0206264 | A1 * | 9/2005 | Yamamoto et al. | 310/216 |
| 2006/0033395 | A1 * | 2/2006 | Izumi et al. | 310/208 |
| 2006/0279146 | A1 * | 12/2006 | Ishigami et al. | 310/71 |
| 2007/0222324 | A1 * | 9/2007 | Fukui et al. | 310/215 |

FOREIGN PATENT DOCUMENTS

| JP | 9-191588 | 7/1997 |
|---|---|---|
| JP | 2002-034212 | 1/2002 |

* cited by examiner

*Primary Examiner*—Thanh Lam
(74) *Attorney, Agent, or Firm*—Jordan and Hamburg LLP

(57) ABSTRACT

A stator includes split cores arranged in a cylindrical shape. Coils are wound continuously around teeth of split cores forming the same electrical phase via a bridge line. On the outer surface of the split core, openings are formed at the upper end face and the lower end face. Through these openings, a convex portion of a jig is inserted to an engagement groove, whereby the split core is supported by the jig. A bridge line of each coil is led out from the teeth side to the outer surface side through an outlet. The led-out bridge lines are placed in storage grooves in a mutually non-contact manner.

7 Claims, 12 Drawing Sheets

STATOR FOR INNER ROTOR TYPE MOLD BRUSHLESS MOTOR

BACKGROUND OF THE INVENTION

1. Field of the Invention

The present invention relates to a stator for an inner rotor type mold brushless motor.

2. Description of the Related Art

As a conventional type of brushless motor, so-called inner rotor type brushless motor in which a rotor is provided inside a stator that generates a magnetic field has been known. In this type of brushless motor, a plurality of teeth protrude toward the inside of the cylindrical stator. Each tooth includes a coil. Inside the stator is provided a rotor having a multipolar magnet. This rotor is rotated by means of the magnetic filed of the stator.

A brushless motor described in JP H9 (1997)-191588 A is provided with a stator including the combination of a plurality of iron core pieces, each corresponding to a tooth, arranged like a circle. To each iron core piece is attached a coil form made of synthetic resin. The coil form is for winding a coil therearound. The outer diameter side of the coil form is provided with a plurality of stages of grooves for holding a bridge line. These grooves are orthogonal to the axis direction of the brushless motor. The respective stages of grooves are formed stepwise, in which a bridge line is held.

In the above mentioned stator, the coil form is provided with the plurality of stages of grooves formed stepwise for holding the bridge line, and the bridge line is placed in the grooves while being bent. Thus, the bridge line may get damaged when it is placed in the grooves.

A brushless motor described in JP 2002-34212 A is provided with a stator composed of twelve split stators. Each split stator includes an iron core piece, a tooth and an insulator provided integrally therewith made of an insulating material. In this insulator, a vertical groove parallel to the axis direction of the motor and a horizontal groove orthogonal to the axis direction are formed. All of the split stators are arranged like a circle, so that bridge lines are placed in the respective stages of the horizontal grooves via the vertical grooves, thus establishing mutual insulation.

In the above mentioned split stators, since the vertical grooves are continuous with all of the horizontal grooves of the brushless motor, a nozzle of a winding machine needs to be driven at a predetermined position of the horizontal grooves precisely.

In addition, in conventional mold brushless motors, when a stator is molded with resin, bridge lines may be displaced due to the pressure of the resin. As a result, the bridge lines may contact with each other, thus causing an electrical short.

SUMMARY OF THE INVENTION

The present invention was accomplished in view of the above described background. An object of the present invention is to provide a stator for an inner rotor type mold brushless motor capable of preventing effectively the damage of a bridge line and an electrical short resulting from the contact between bridge lines when the stator is molded.

Other objects and effects of the present invention will be clarified from the following detailed explanations.

A stator for an inner rotor type mold brushless motor according to the present invention includes a plurality of split cores each corresponding to a tooth and arranged in a cylindrical shape; end insulators, each of which covers the tooth of each split core for insulation; and coils that are insulated from the split cores by the end insulators and are wound continuously around teeth of split cores forming a same electrical phase via a bridge line. An outer surface of each split core is provided with openings at both ends of the split core in a motor axis direction, the openings communicating with each other, and an engagement groove that can engage with a jig that supports the split core. Each end insulator is provided with an outlet and storage grooves, the outlet leading the bridge line of each coil to an outer surface side of the end insulator and the storage grooves accommodating bridge lines of coils forming different electrical phases in a mutually non-contact manner.

A stator according to the present invention includes a plurality of split cores arranged in a cylindrical shape. A tooth of each split core is insulation-covered with an end insulator. Therefore, coils are wound continuously around teeth, while being insulated from the split cores. The continuous winding is performed with respect to split cores forming a same electrical phase. A bridge line is provided between the split cores. Openings are formed at both end faces in the motor axis direction of each split core. An engagement groove is formed on the outer surface of the split core. This engagement groove is used for supporting the split core by a jig. Each end insulator includes an outlet and storage grooves. A bridge line of each coil is led out from the tooth side to the outer surface side of the end insulator through the outlet. The led-out bridge line is placed in storage grooves. Thereby, bridge lines of the coils forming different electrical phases can be in a non-contact manner. Furthermore, the bridge lines are not displaced by external force.

DESCRIPTION OF THE PREFERRED EMBODIMENTS

The following describes the present invention in detail by way of preferred embodiments, with reference to the drawings as appropriate.

An inner rotor type mold brushless motor 100 (hereinafter this may be simply called "motor 100") includes a stator 10 and a rotor (not illustrated). The motor 100 is an inner rotor type mold brushless motor that is rotated by a three-phase current. The stator 10 is an external stator of the motor 100. The stator 10 is molded in one piece by so-called insert molding. The rotor is an internal rotor of the motor 100. Although not illustrated, the rotor includes a shaft serving as an axis of the motor 100 and a rotor yoke provided concentrically with the shaft. The rotor yoke is provided with a cylindrical multipolar magnet at the rim thereof. The stator 10 has the outside shape that is substantially cylindrical, and has an internal space in which the rotor is placed. The rotor is placed in this internal space with a predetermined magnetic gap interposed therebetween, and is rotated by a revolving magnetic field generated by the stator 10.

Figure 2:
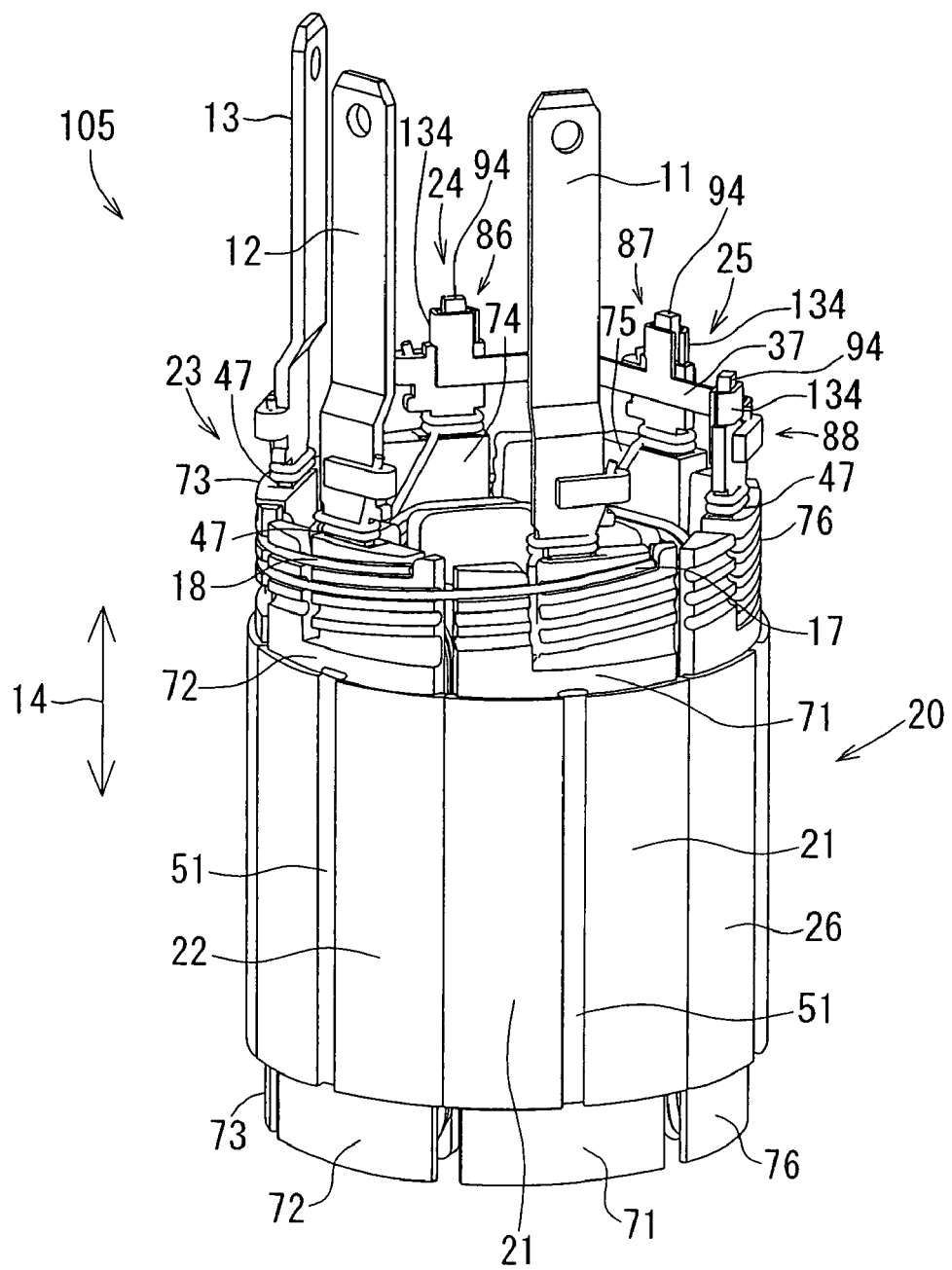
FIG. 2 is a perspective view of a joined core 105, showing the state before the stator 10 is molded.

As shown in FIG. 2, in the present embodiment, a joined core 105 is composed of six (one example as plural) split cores 21 to 26. The split cores 21 to 26 have the same shape. Thus, the following description exemplifies the split core 21, and the explanations for the other split cores 22 to 26 will be omitted. The split cores 21 to 26 are arranged cylindrically so that their respective teeth 38 (see FIG. 3) with coils 31 to 36 (see FIG. 6) wound therearound face inward (see FIG. 6). In this state, the split cores 21 to 26 are joined to constitute the cylindrical joined core 105 in one piece. The joined core 105 is resin-molded, thus obtaining the stator 10.

Figure 3:
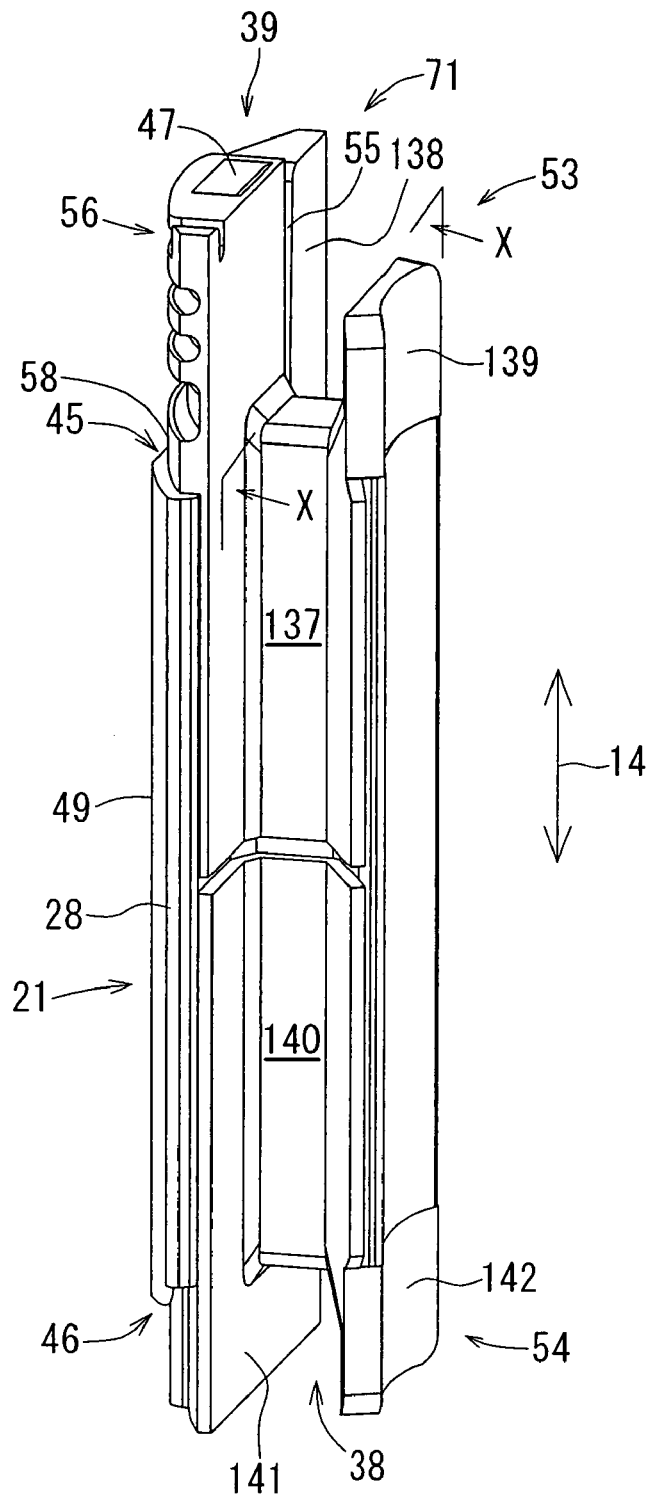
FIG. 3 is a perspective view of a split core 21, showing a tooth 38 thereof.

As shown in FIG. 3, the split core 21 has a substantially T-shape in a plan view, in which a plurality of steel plates having the same shape in the plan view are laminated along the motor axis direction 14. These steel plates are mutually adhered by bonding, caulking, welding or the like. The split core 21 includes a core yoke 39 and a tooth 38. That is, the split cores 21 to 26 are divided for each tooth 38. The core yoke 39 is joined with the core yokes 39 of the other split cores 22 to 26 like a circle (see FIG. 6). In this joined state, the teeth 38 protrude inward in the radial direction of the stator 10. In the present embodiment, the stator 10 is composed of six split cores 21 to 26 as described above. Therefore, each core yoke 39 is formed so that its width occupies about one-sixth of the dimension in the circumferential direction of the stator 10. The core yoke 39 includes a convex portion 28 (see FIG. 3) at an edge contacting with the split core 26, and includes a concave portion (not illustrated) at an edge contacting with the split core 22. The convex portion 28 and the concave portion are formed at the core yokes 39 of the split cores 22 to 26 as well, so that the engagement of the corresponding convex portion 28 and concave portion allows the mutual alignment of the split cores 21 to 26. Around the tooth 38 is wound a coil 31 that generates a revolving magnetic field of the motor 100 (see FIG. 6). The coil 31 is wound around the tooth 38 via an end insulator 71 described later. The coil 31 is wound around the tooth 38 in the state the split cores 21 to 26 are arranged in the circumferential direction so that the teeth 38 face outward (see FIG. 11). Herein, similarly to the split core 21, coils 32 to 36 are wound around the teeth 38 of the split cores 22 to 26, respectively.

The split cores 21 to 26 are provided with end insulators 71 to 76, respectively (see FIG. 2). The end insulators 71 to 76 have the same shape. Thus, the following description exemplifies the end insulator 71, and the explanations for the other end insulators 72 to 76 will be omitted. The end insulator 71 (see FIG. 3) covers the tooth 38 of the split core 21 for insulation. The end insulator 71 may be formed of synthetic resin having electrical insulating properties by molding. The end insulator 71 includes, in a plan view, a portion corresponding to the tooth 38 and a portion corresponding to the core yoke 39, and has substantially the same T-shape as that of the split core 21. A pair of upper and lower end insulators 71 covers an upper end face 45, a lower end face 46 and the tooth 38 of the split core 21. The upper end face 45 and the lower end face 46 are both end faces of the split core 21 in the motor axis direction 14. The split core 21 is exposed partially from the end insulator 71 on the outer surface side (see FIG. 3). The coil 31 is insulated from the split core 21 by the end insulator 71, and is wound around the tooth 38 of the split core 21.

The pair of end insulators 71 consists of a first insulator 53 and a second insulator 54. The first insulator 53 and the second insulator 54 have a substantially U-shape at the tooth 38 in cross section (shown by X-X line in FIG. 3) in the circumferential direction of the stator 10. The first insulator 53 is fitted in the split core 21 so as to sandwich both side faces of the tooth 38 from above the split core 21. Thereby, the upper end face 45 of the split core 21 and an approximate upper half of the tooth 38 are covered with the first insulator 53 (see FIG. 3). The second insulator 54 is fitted in the split core 21 so as to sandwich both side faces of the tooth 38 from beneath the split core 21. Thereby, the lower end face 46 of the split core 21 and an approximate lower half of the tooth 38 are covered with the second insulator 54 (see FIG. 3). There is a gap between the first insulator 53 and the second insulator 54 at the middle position of the tooth 38 in the motor axis direction 14. It is designed so that the coil 31 wound around the end insulator 71 does not contact with the split core 21 in this gap.

The first insulator 53 includes a coil winding portion 137, an outer wall 138 and an inner wall 139. The coil winding portion 137, around which the coil 31 is wound, supports the coil 31. The outer wall 138 and the inner wall 139 are formed continuously with the coil winding portion 137 so as to protrude upward from the upper end face 45. The coil 31 is formed by winding a copper wire around the coil winding portion 137 and a coil winding portion 140 described later. The coil 31 is supported by the outer wall 138 and the inner wall 139 in the radial direction of the stator 10. Thereby, the collapse of the coil 31 can be prevented. The outer wall 138 supports the coil 31 as well as bridge lines 17 to 19. The outer wall 138 has an outer surface 58 that is provided with storage grooves 61 to 64 (see FIG. 8). The bridge lines 17 to 19 are placed in any one of the storage grooves 61 to 64, and are held thereby. The storage grooves 61 to 64 will be described later in detail.

The second insulator 54 includes a coil winding portion 140, an outer wall 141 and an inner wall 142. The coil winding portion 140, around which the coil 31 is wound, supports the coil 31 together with the coil winding portion 137. The outer wall 141 and the inner wall 142 are formed continuously with the coil winding portion 140 so as to protrude downward from the lower end face 46. This coil 31 is supported by the outer wall 141 and the inner wall 142 which are provided in the radial direction of the stator 10. Thereby, the collapse of the coil 31 can be prevented. Further, the storage grooves 61 to 64 may be formed on the outer surface of the outer wall 141 instead of the outer surface 58.

As shown in FIG. 3, the end insulator 71 includes an insertion portion 47. The insertion portion 47 is formed at an approximate center of the top face of the outer wall 138. The insertion portion 47 is formed in each of the end insulators 72 to 76 as well. As shown in FIG. 2, an external terminal 11 is fitted in the insertion portion 47 of the end insulator 71. An external terminal 12 is fitted in the insertion portion 47 of the end insulator 72. An external terminal 13 is fitted in the insertion portion 47 of the end insulator 73. An internal terminal 86 is fitted in the insertion portion 47 of the end insulator 74. An internal terminal 87 is fitted in the insertion portion 47 of the end insulator 75. An internal terminal 88 is fitted in the insertion portion 47 of the end insulator 76. The external terminal 11 and the internal terminal 86 are connected with the copper wire of the coils 31 and 34, at their winding-start and winding-end, which forms a U-phase magnetic circuit (see FIG. 6). The external terminal 12 and the internal terminal 87 are connected with the copper wire of the coils 32 and 35 at their winding-start and winding-end, which forms a V-phase magnetic circuit (see FIG. 6). The external terminal 13 and the internal terminal 88 are connected with the copper wire of the coils 33 and 36 at their winding-start and winding-end, which forms a W-phase magnetic circuit (see FIG. 6).

Figure 4:
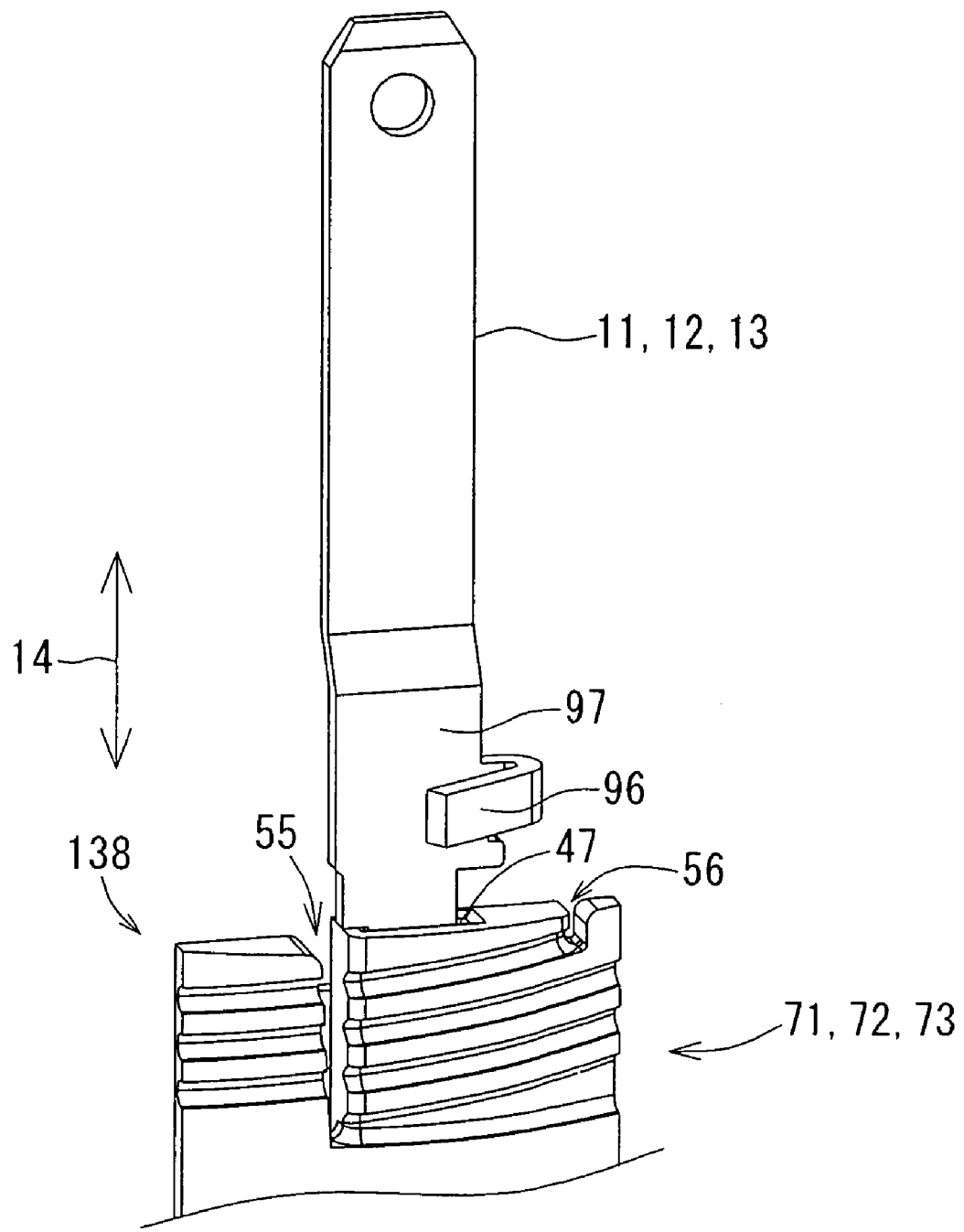
FIG. 4 is a perspective view showing external terminals 11, 12 and 13.

As shown in FIG. 4, the external terminals 11, 12 and 13 (see FIG. 1 and FIG. 2) have the same shape that is a flat-plate shape whose longitudinal direction is in the motor axis direction 14. The external terminals 11, 12 and 13 are fixed to the insertion portions 47 of the end insulators 71, 72 and 73, respectively (see FIG. 2). Terminal bodies 97 of the external terminals 11, 12 and 13 are inserted into the insertion portions 47 at their lower ends, so as to be supported stably by the insertion portions 47. The external terminals 11, 12 and 13 are fixed to the insertion portions 47 by pressing the split cores 21 to 23 into the respective insertion portions 47 or using an adhesive. Each terminal body 97 is provided with a sandwiching piece 96. The sandwiching piece 96 is continuous with the terminal body 97 and faces the terminal body 97. Each of the copper wires of the coils 31 to 33 at the winding-start is sandwiched by the terminal body 97 and the sandwiching piece 96 and is electrically connected with the corresponding one of the external terminal 11, 12 and 13 (see FIG. 4 and FIG. 2). The copper wire of the coil 31 at the winding-start is electrically connected with the external terminal 11. The copper wire of the coil 32 at the winding-start is electrically connected with the external terminal 12. The copper wire of the coil 33 at the winding-start is electrically connected with the external terminal 13.

Figure 5:
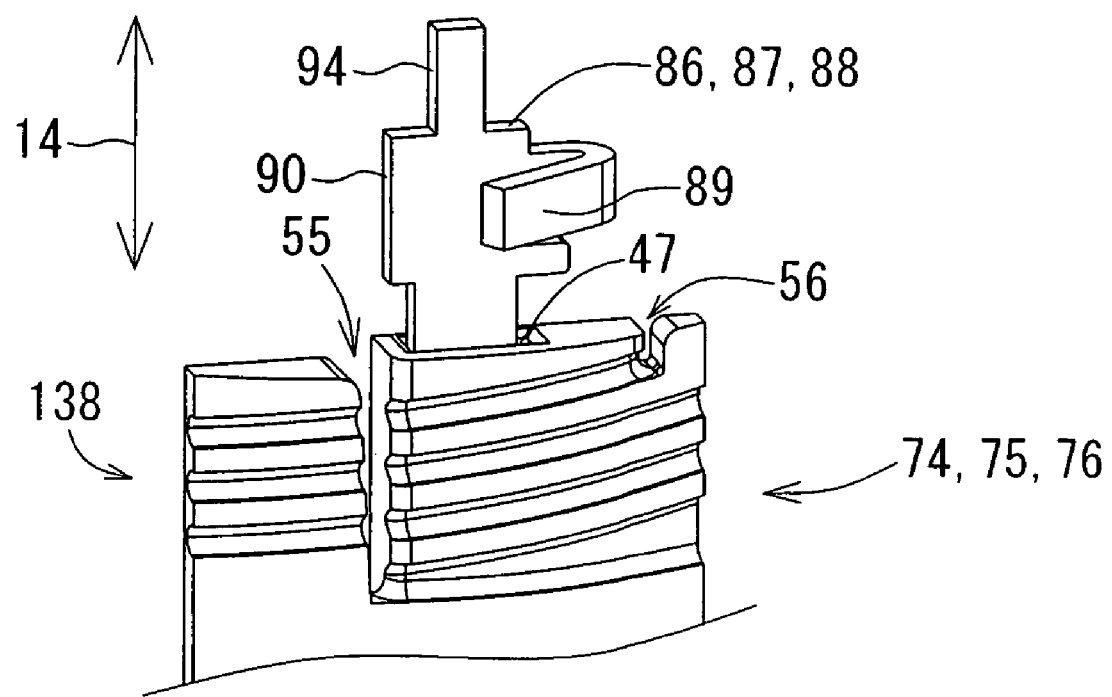
FIG. 5 is a perspective view showing internal terminals 86, 87 and 88.

As shown in FIG. 5, the internal terminals 86, 87 and 88 (see FIG. 2) have the same shape that is a flat-plate shape with an approximate square in a plan view. The internal terminals 86, 87 and 88 are fixed to the insertion portions 47 of the end insulators 74, 75 and 76, respectively (see FIG. 2). Terminal bodies 90 of the internal terminals 86, 87 and 88 are inserted into the insertion portions 47 at their lower ends, so as to be supported stably by the insertion portions 47. The internal terminals 86, 87 and 88 are fixed to the insertion portions 47 by pressing the split cores 24 to 26 into the respective insertion portions 47 or using an adhesive. Each terminal body 90 is provided with a sandwiching piece 89. The sandwiching piece 89 is continuous with the terminal body 90 and faces the terminal body 90. Each of the copper wires of the coils 34 to 36 at the winding-end is sandwiched by the terminal body 90 and the sandwiching piece 89 and is electrically connected with the corresponding one of the internal terminal 86, 87 and 88 (see FIG. 5 and FIG. 2). The copper wire of the coil 34 at the winding-end is electrically connected with the internal terminal 86. The copper wire of the coil 35 at the winding-end is electrically connected with the internal terminal 87. The copper wire of the coil 36 at the winding-end is electrically connected with the internal terminal 88.

Figure 6:
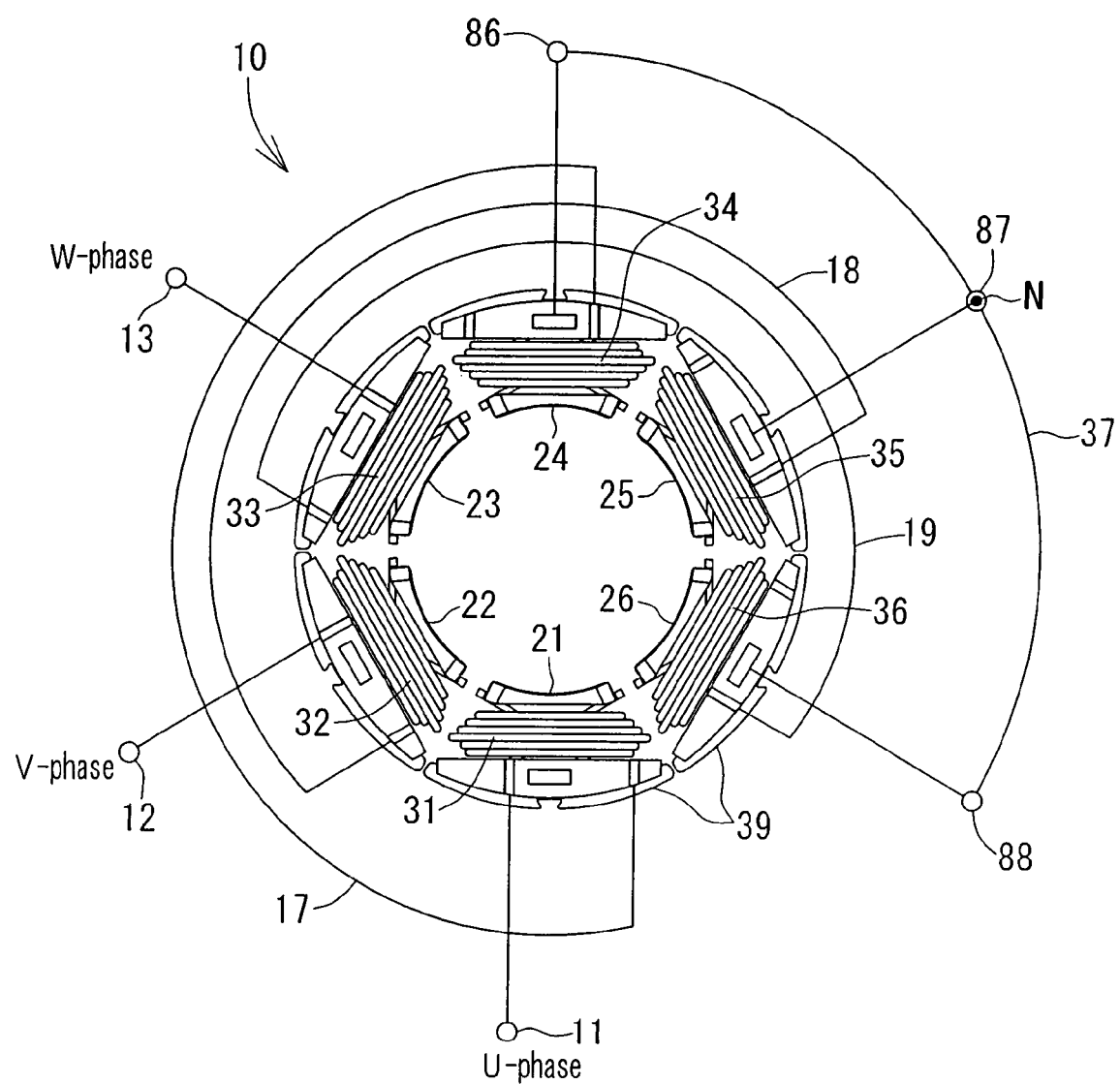
FIG. 6 schematically shows split cores 21 to 26 around which coils 31 to 36 are wound.
Figure 7:
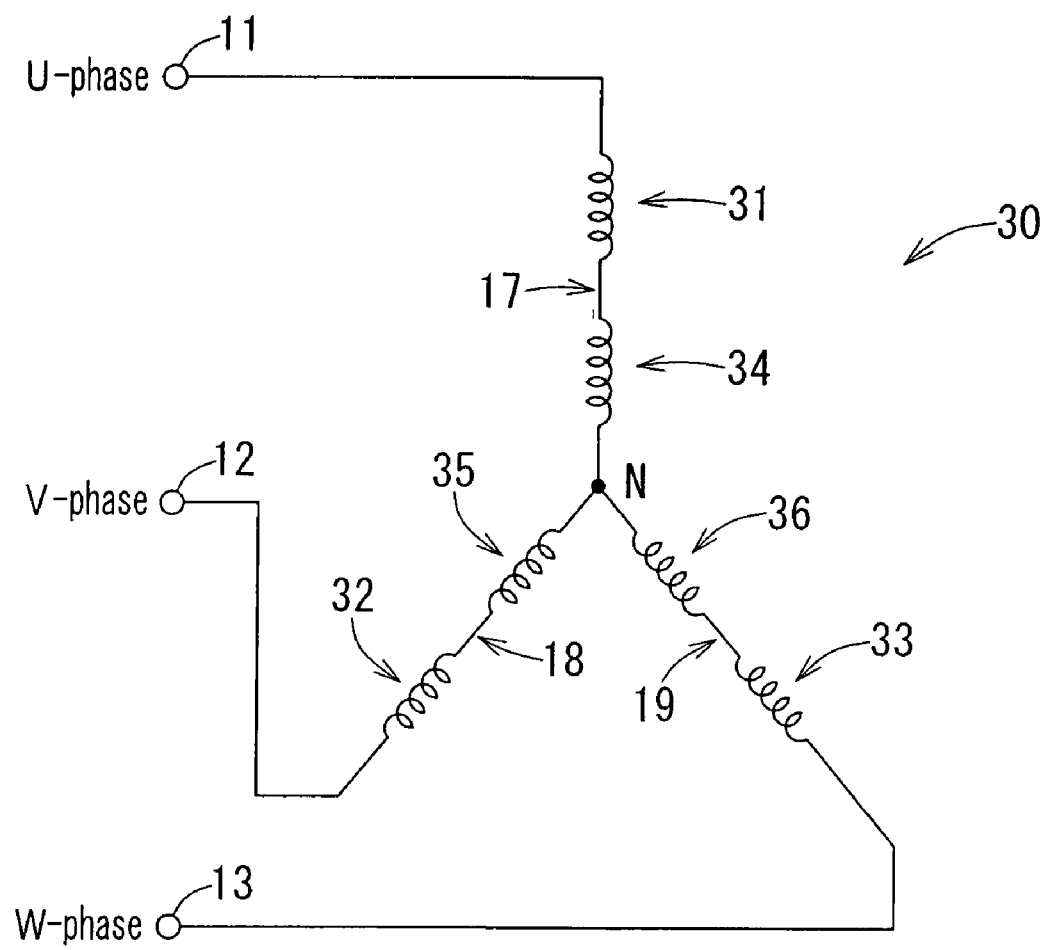
FIG. 7 is a connection wiring diagram of the coils 31 to 36.

The coil 31 and the coil 34 are continuously wound as follows. One copper wire is connected with the external terminal 11 of the split core 21 at the winding-start (see FIG. 2). As shown in FIG. 6, the copper wire is wound around the tooth 38 of the split core 21 (see FIG. 3). This copper wire is wound around the tooth 38 of the split core 24 via the bridge line 17. In this way, the coil 31 and the coil 34 are continuously wound using one copper wire via the bridge line 17, thus forming a U-phase split core group. The copper wire of the coil 34 at the winding-end is connected with the internal terminal 86 of the split core 24 (see FIG. 2). The internal terminal 86 is connected with a short member 37 (see FIG. 2). The copper wire is connected with the internal terminal 86, thus connecting with a neutral point N.

The coil 32 and the coil 35 are continuously wound as follows. One copper wire is connected with the external terminal 12 of the split core 22 at the winding-start (see FIG. 2). As shown in FIG. 6, the copper wire is wound around the tooth 38 of the split core 22 (see FIG. 3). This copper wire is wound around the tooth 38 of the split core 25 via the bridge line 18. In this way, the coil 32 and the coil 35 are continuously wound using one copper wire via the bridge line 18, thus forming a V-phase split core group. The copper wire of the coil 35 at the winding-end is connected with the internal terminal 87 of the split core 25 (see FIG. 2). The internal terminal 87 is connected with the short member 37 (see FIG. 2). The copper wire is connected with the internal terminal 87, thus connecting with the neutral point N.

The coil 33 and the coil 36 are continuously wound as follows. One copper wire is connected with the external terminal 13 of the split core 23 at the winding-start (see FIG. 2). As shown in FIG. 6, the copper wire is wound around the tooth 38 of the split core 23 (see FIG. 3). This copper wire is wound around the tooth 38 of the split core 26 via the bridge line 19. In this way, the coil 33 and the coil 36 are continuously wound using one copper wire via the bridge line 19, thus forming a W-phase split core group. In this way, the coils 31 to 36 are continuously wound around the teeth 38 of the split cores 21 to 26 forming the same electrical phase via the bridge lines 17 to 19. The copper wire of the coil 36 at the winding-end is connected with the internal terminal 88 of the split core 26 (see FIG. 2). The internal terminal 88 is connected with the short member 37 (see FIG. 2). The copper wire is connected with the internal terminal 88, thus connecting with the neutral point N.

In the stator 10, the coils 31 to 36 form a magnetic circuit with three phases (U-phase, V-phase and W-phase). The U-phase magnetic circuit is formed by the coils 31 and 34 provided in the split cores 21 and 24 that are continuously wound in series using one copper wire via the bridge line 17. The V-phase magnetic circuit is formed by the coils 32 and 35 provided in the split cores 22 and 25 that are continuously wound in series using one copper wire via the bridge line 18. The W-phase magnetic circuit is formed by the coils 33 and 36 provided in the split cores 23 and 26 that are continuously wound in series using one copper wire via the bridge line 19. At the neutral point N, the copper wire of the coil 34 at the winding-end, the copper wire of the coil 35 at the winding-end, and the copper wire of the coil 36 at the winding-end are connected. They are connected by connecting the short member 37 with the internal terminals 86 to 88.

Figure 8:
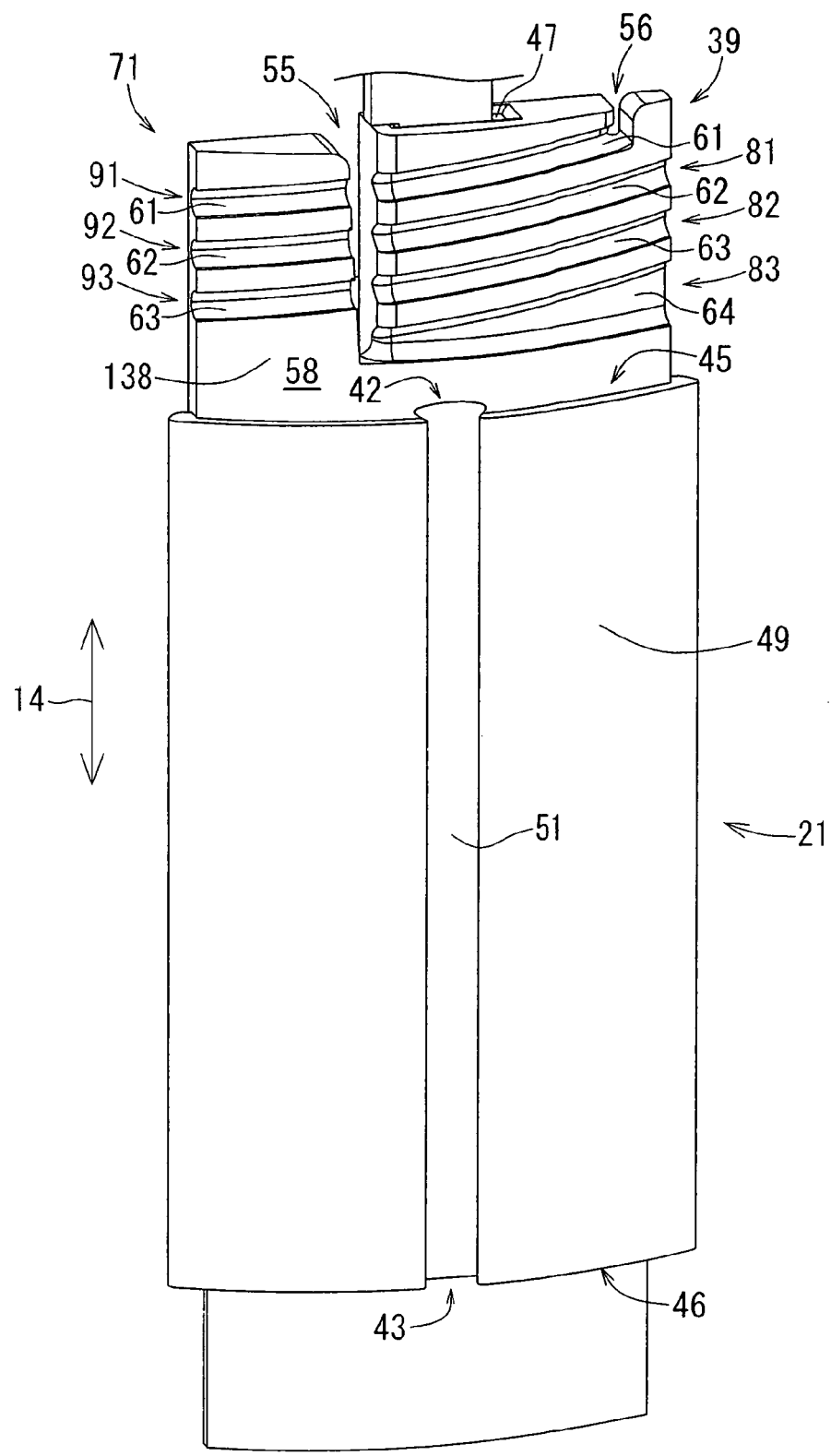
FIG. 8 is a perspective view of the split core 21, showing an outer surface 49 and an outer surface 58.

As shown in FIG. 8, the split core 21 includes openings 42 and 43. The opening 42 is formed at the upper end face 45. The opening 42 is not covered with the outer wall 138 (see FIG. 3). The opening 43 is formed at the lower end face 46. The opening 43 is not covered with the outer wall 141 (see FIG. 3). On the outer surface 49 of the split core 21 is formed an engagement groove 51. The engagement groove 51 are formed in a straight line in the motor axis direction 14. Therefore, the openings 42 and 43 can communicate with each other via the engagement groove 51. The engagement groove 51 can engage with a jig 70 (see FIG. 11 and FIG. 12) for supporting the split core 21. The engagement groove 51 is a so-called dovetail groove whose outside width in the radial direction of the split core 21 is smaller than the inside width in the radial direction (see FIG. 8).

Figure 11:
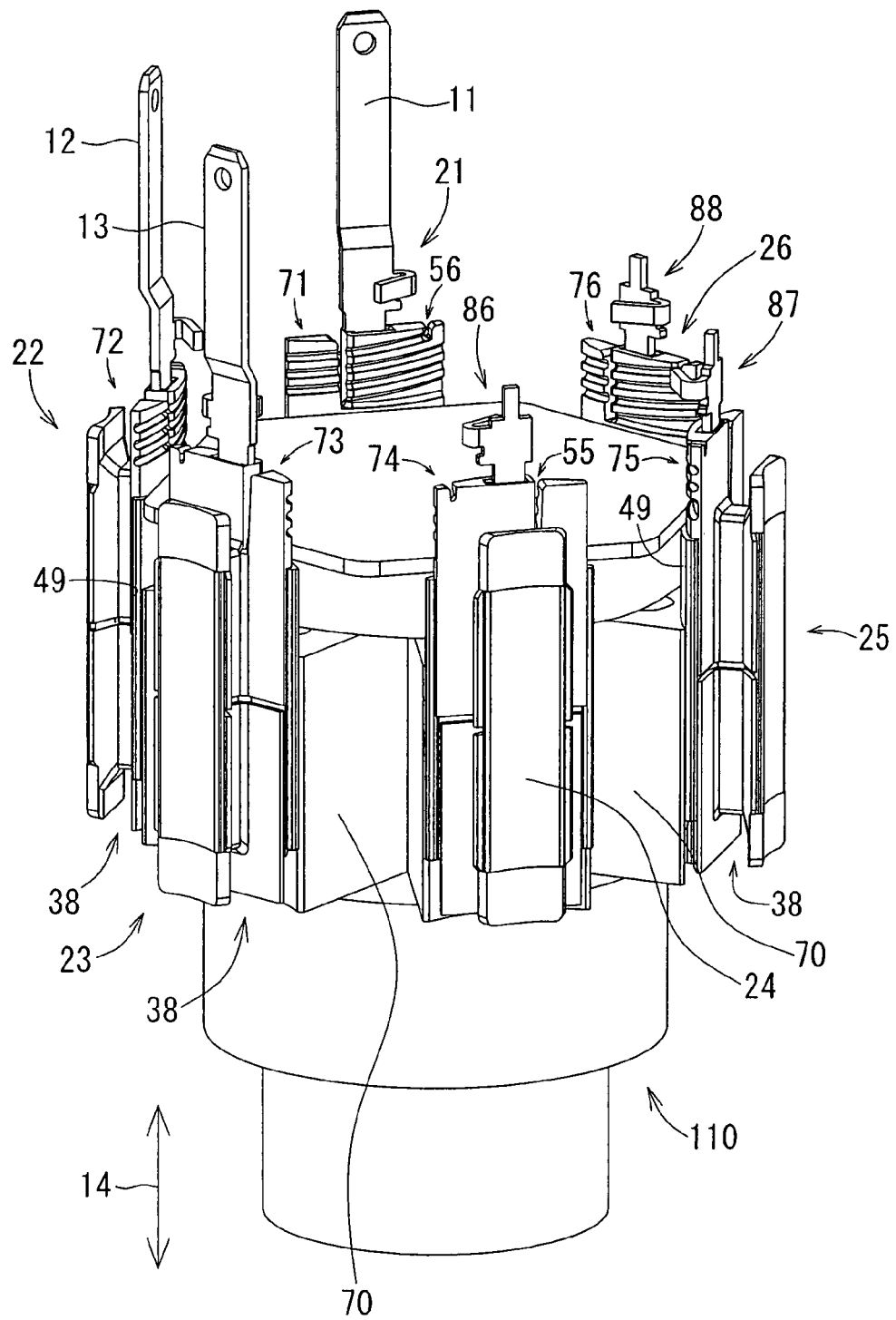
FIG. 11 is a perspective view of the split cores 21 to 26 arranged in the circumferential direction so that their teeth 38 face outward.
Figure 12:
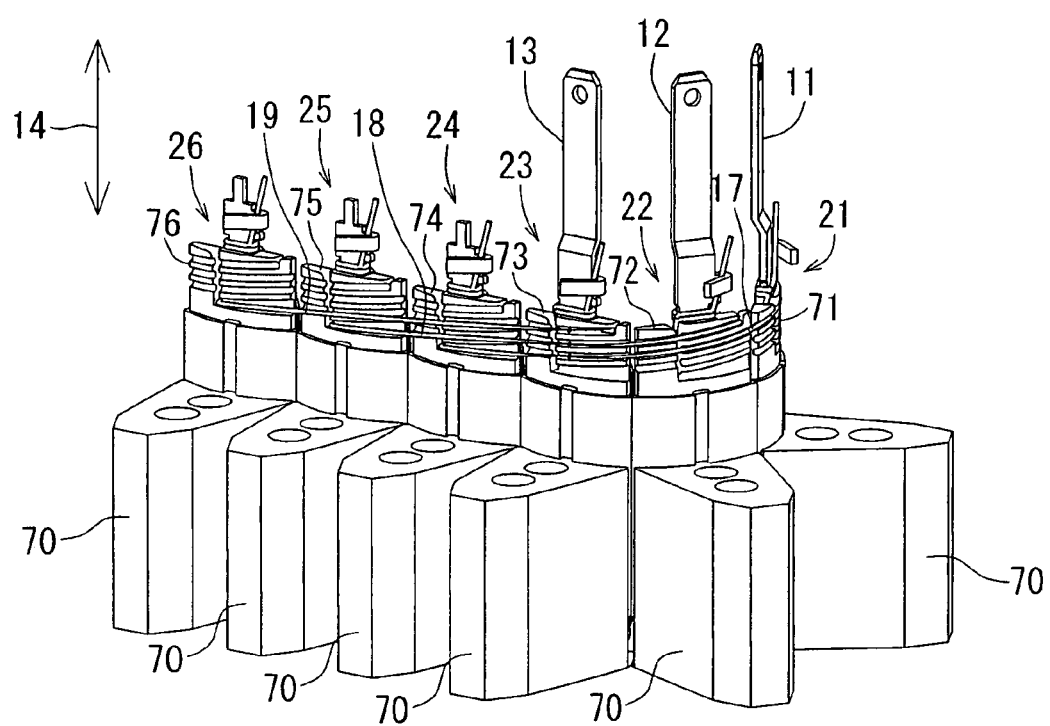
FIG. 12 is a perspective view showing the progress to arrange the split cores 21 to 26 in a cylindrical shape.

The jig 70 supports each of the split cores 21 to 26 during the course of manufacturing the stator 10 (see FIG. 11 and FIG. 12). In the split cores 21 to 26, the continuous winding of the coils 31 and 34, the coils 32 and 35, and the coils 33 and 36 is performed, respectively, while supporting the split cores by the respective jigs 70. Although not illustrated, the jig 70 includes a convex portion. The convex portion has substantially the same shape as that of the inner space of the engagement groove 51 in a plan view. From the state where the jig 70 is aligned with respect to the split core 21 along the motor axis direction 14, the convex portion of the jig 70 is made to enter the engagement groove 51 through the opening 43 (see FIG. 8). In this manner, the split core 21 is latched by the jig 70 so as to be supported so that the split core 21 is stably supported. (see FIG. 11).

As shown in FIG. 8, storage grooves 61 to 64 are formed on the outer surfaces 58 of the end insulators 71 to 76. The storage grooves 61 to 64 accommodate the bridge lines 17 to 19 of the coils 31 to 36 therein, which form different electrical phases (see FIG. 11). The storage grooves 61 to 64 are aligned in the motor axis direction 14 to be in stages in number (in this case, four stages) corresponding to the number of electrical phases to be formed by the coils 31 to 36 (in the present embodiment, three phases). The storage grooves 61 to 64 are concave grooves that are dented inward in the radial direction from the outer surface 58 of the stator 10 so as to correspond to the diameter of the bridge lines 17 to 19. The width of the storage grooves 61 to 63 in the motor axis direction 14 is set somewhat larger than the diameter of the bridge lines 17 to 19. The width of the storage groove 64 in the motor axis direction 14 is set sufficiently larger than the diameter of the bridge lines 17 to 19 on the right edge side of the outer wall 138 of FIG. 8, and is set somewhat larger than the diameter of the bridge lines 17 to 19 on the center portion side in the width direction of the outer wall 138. Therefore, the bridge lines 17 to 19 can be easily placed in the storage grooves 61 to 64. The depth of the storage grooves 61 to 64 is set somewhat larger than the diameter of the bridge lines 17 to 19. Therefore, the bridge lines 17 to 19 placed in the storage grooves 61 to 64 are not exposed beyond the outer surface 58 to the outside in the radial direction of the stator 10.

The storage groove 61 is continuous with a second outlet 56 described later. The storage groove 61 is formed on the outer surface 58 so as to extend from a position continuous with the second outlet 56 to the left side in the circumferential direction of the stator 10 (hereinafter also called as "left side in the circumferential direction"). Thus, the storage groove 61 includes an opening 91 at the edge of the left side in the circumferential direction on the outer surface 58. The storage groove 62 is formed on the outer surface 58 immediately beneath the storage groove 61. The storage groove 62 is formed on the outer surface 58 so as to extend from the edge of the right side in the circumferential direction of the stator 10 (hereinafter this may simply called "right side in the circumferential direction" also) to the edge of the left side in the circumferential direction. Thus, the storage groove 62 includes an opening 81 at the edge of the right side in the circumferential direction on the outer surface 58, and includes an opening 92 at the edge of the left side in the circumferential direction. The storage groove 63 is formed on the outer surface 58 immediately beneath the storage groove 62. The storage groove 63 is formed on the outer surface 58 so as to extend from the edge of the right side in the circumferential direction to the edge of the left side in the circumferential direction. Thus, the storage groove 63 includes an opening 82 at the edge of the right side in the circumferential direction on the outer surface 58, and includes an opening 93 at the edge of the left side in the circumferential direction. The storage groove 64 is formed on the outer surface 58 immediately beneath the storage groove 63. The storage groove 64 is formed so as to extend from a position continuous with a first outlet 55 described later to the right side in the circumferential direction. Thus, the storage groove 64 includes an opening 64 at the edge of the right side in the circumferential direction on the outer surface 58.

As shown in FIG. 8, on the outer wall 138 are formed outlets 55 and 56 at two positions. The first outlet 55 and the second outlet 56 are openings for leading out the bridge lines 17 to 19 of the coils 31 to 36 from the teeth 38 side to the outer surface 58 side. The first outlet 55 is formed somewhat to the left side in the circumferential direction from the center in the width direction of the outer wall 138. The first outlet 55 is formed so that the outer wall 138 is partially cut from the upper edge to the intersecting position with the storage groove 64 in the motor axis direction 14 (see FIG. 8). The first outlet 55 is continuous with all of the storage grooves 61 to 64 on the outer surface 58. Thus, through the first outlet 55, the bridge line placed in the lowermost storage groove 64 (e.g., the bridge line 17) can be wired from the outer surface 58 side to the teeth 38 side easily. The bridge line 17 placed in the lowermost groove 64 may be wired linearly to the inside in the radial direction of the stator 10 through the portion where the storage groove 64 is continuous with the first outlet 55. Thus, the bridge line 17 placed in the storage groove 64 and the bridge lines 18 and 19 placed in the upper storage grooves 61 to 63 can be wired in a non-contact manner (see the end insulator 74 of FIG. 10). The second outlet 56 is formed somewhat inward from the edge of the right side in the circumferential direction of the outer wall 138. The second outlet 56 is formed so that the outer wall 138 is partially cut from the upper edge to the intersecting position with the uppermost storage groove 61 in the motor axis direction 14 (see FIG. 8). The second outlet 56 is continuous with the uppermost storage groove 61 formed on the outer surface 58. Thus, by leading out the bridge line 17 through the second outlet 56, for example, the bridge line 17 can be securely placed in the storage groove 61. In other words, the bridge line 17 led out through the second outlet 56 is not placed in the other storage grooves 62 to 64.

As shown in FIG. 8, the storage grooves 61 to 64 are mutually parallel. Therefore, the bridge lines 17 to 19 placed in the storage grooves 61 to 64 do not intersect with each other. The storage grooves 61 to 64 are inclined with respect to the motor axis direction 14. The inclination angle of the storage grooves 61 to 64 with respect to the motor axis direction 14 is set as follows. That is, the opening 81 and the opening 91 are located in substantially the same position in the motor axis direction 14. The opening 82 and the opening 92 are located in substantially the same position in the motor axis direction 14. The opening 83 and the opening 93 are located in substantially the same position in the motor axis direction 14.

Figure 9:
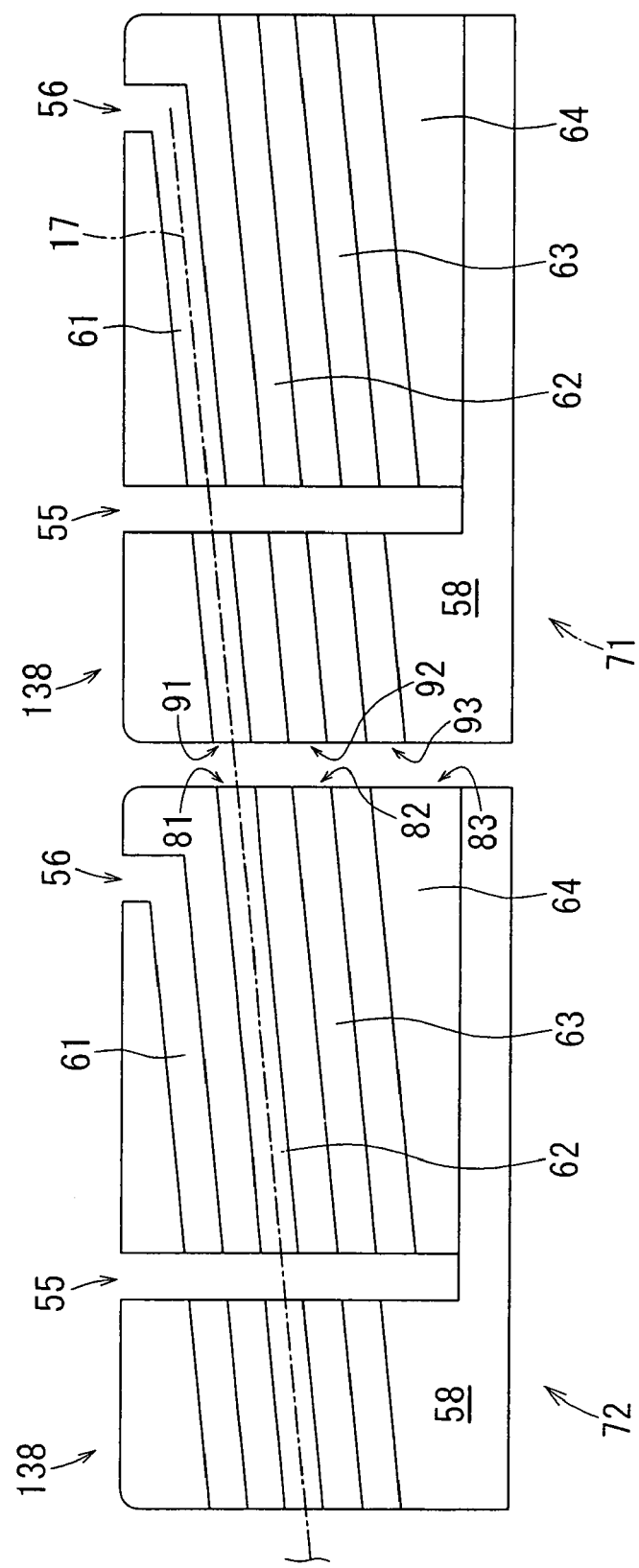
FIG. 9 schematically shows two adjacent outer walls 138.

As shown in FIG. 9, when the split cores 21 to 26 are arranged in a cylindrical shape, the openings 91, 92 and 93 of the storage grooves 61, 62 and 63 of the end insulator 71 on the right side are respectively opposed to the openings 81, 82 and 83 of the storage grooves 62, 63 and 64 of the end insulator 72 on the left side. Thus, the storage groove 61 of the end insulator 71 on the right side is linearly continuous with the storage groove 62 of the end insulator 72 on the left side along the outer surface 58. Herein, the term "linearly continuous" refers to the state where the opening 91 of the storage groove 61 of the end insulator 71 on the right side is opposed to the opening 81 of the storage groove 62 of the end insulator 72 on the left side. In such linearly continuous state, the bridge line 17, for example, can be placed without being bent in the storage groove 61 of the end insulator 71 and in the storage groove 62 of the end insulator 72. Similarly, the storage groove 62 of the end insulator 71 on the right side is linearly continuous with the storage groove 63 of the end insulator 72 on the left side along the outer surface 58. The storage groove 63 of the end insulator 71 on the right side is linearly continuous with the storage groove 64 of the end insulator 72 on the left side along the outer surface 58. Note here that although two adjacent end insulators 71 and 72 are exemplified here, other end insulators 73 to 76 also have similar positional relationships with their adjacent end insulators. FIG. 9 is a planar development view of the outer surfaces 58 of the end insulators 71 and 72 for convenience of description.

Figure 10:
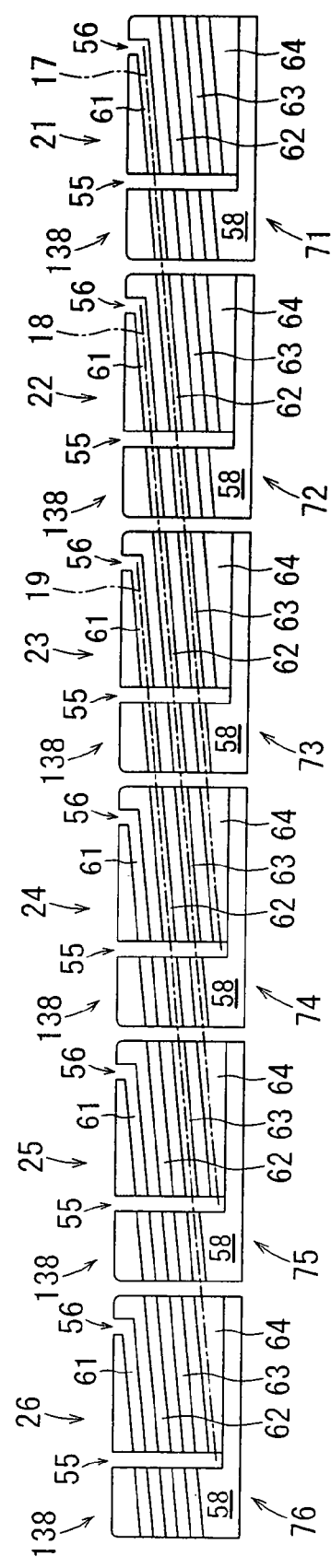
FIG. 10 schematically shows a part of end insulators 71 to 76 of the split cores 21 to 26.

The coil 31 (see FIG. 6) is formed at the tooth 38 (see FIG. 3) of the split core 21. The copper wire making up the coil 31 is led out from the tooth 38 side of the split core 21 to the outer surface 58 side through the second outlet 56 (see FIG. 3). As shown in FIG. 10, this copper wire is placed as the bridge line 17 in the storage groove 61 of the first stage of the split core 21, the storage groove 62 of the second stage of the split core 22, the storage groove 63 of the third stage of the split core 23 and the storage groove 64 of the fourth stage of the split core 24. In this way, the storage groove 61 of the split core 21, the storage groove 62 of the split core 22, the storage groove 63 of the split core 23 and the storage groove 64 of the split core 24, which are adjacent to each other, accommodate one bridge line 17 in cooperation with each other. Such a bridge line 17 is led out through the first outlet 55 of the split core 24 from the outer surface 58 side to the tooth 38 side. This copper wire makes up the coil 34 at the tooth 38 of the split core 24 (see FIG. 6). FIG. 10 is a planar development view of the outer surfaces 58 of the end insulators 71 to 76 for convenience of description.

The coil 32 (see FIG. 6) is formed at the tooth 38 of the split core 22. The copper wire making up the coil 32 is led out from the tooth 38 side of the split core 22 to the outer surface 58 side through the second outlet 56 (see FIG. 3). As shown in FIG. 10, this copper wire is placed as the bridge line 18 in the storage groove 61 of the first stage of the split core 22, the storage groove 62 of the second stage of the split core 23, the storage groove 63 of the third stage of the split core 24 and the storage groove 64 of the fourth stage of the split core 25. In this way, the storage groove 61 of the split core 22, the storage groove 62 of the split core 23, the storage groove 63 of the split core 24 and the storage groove 64 of the split core 25, which are adjacent to each other, accommodate one bridge line 18 in cooperation with each other. Such a bridge line 18 is led out through the first outlet 55 of the split core 25 from the outer surface 58 side to the tooth 38 side. In this manner, the copper wire makes up the coil 35 at the tooth 38 of the split core 25 (see FIG. 6).

The coil 33 (see FIG. 6) is formed at the tooth 38 of the split core 23. The copper wire making up the coil 33 is led out from the tooth 38 side of the split core 23 to the outer surface 58 side through the second outlet 56 (see FIG. 3). As shown in FIG. 10, this copper wire is placed as the bridge line 19 in the storage groove 61 of the first stage of the split core 23, the storage groove 62 of the second stage of the split core 24, the storage groove 63 of the third stage of the split core 25 and the storage groove 64 of the fourth stage of the split core 26. In this way, the storage groove 61 of the split core 23, the storage groove 62 of the split core 24, the storage groove 63 of the split core 25 and the storage groove 64 of the split core 26, which are adjacent to each other, receive one bridge line 19 in cooperation with each other. Such a bridge line 19 is led out through the first outlet 55 of the split core 26 from the outer surface 58 side to the tooth 38 side. In this manner, the copper wire makes up the coil 36 at the tooth 38 of the split core 26 (see FIG. 6).

As above described, each of the storage grooves 61 to 64 of the split cores 21 to 26 receives one bridge line in cooperation with storage grooves of different stages of their adjacent end insulators. For instance, as shown in FIG. 10, the storage groove 63 of the third stage of the split core 24 accommodates one connective wire 18 in cooperation with the storage groove 62 of the second stage of the split core 23 and the storage groove 64 of the fourth stage of the split core 25. For instance, the storage groove 62 of the second stage of the split core 22 accommodates one connective wire 17 in cooperation with the storage groove 61 of the first stage of the split core 21 and the storage groove 63 of the third stage of the split core 23. Thereby, even in the case where split cores with a common electrical phase (e.g., the split cores 21 and 24) sandwich split cores with a different electrical phase (e.g., the split core 22 and 23), the bridge line 17 as a whole can be placed in the storage grooves 61 to 64 (see FIG. 10 and FIG. 2). Since the bridge line 17 to 19 are placed in different stages of storage grooves 61 to 64 among the end insulators 71 to 76, the bridge lines 17 to 19 can be placed and held in the storage grooves 61 to 64 in a mutually non-contact manner.

The storage grooves 61 to 64 that accommodate one bridge line (any one of the bridge lines 17 to 19) are continuous line linearly (see FIG. 10). Thereby, when the joined core 105 (see FIG. 2) is molded with mold resin 99 (see FIG. 1), a load applied to the bridge lines 17 to 19 can be reduced, thus preventing the damage and a break of the bridge lines 17 to 19.

Figure 1:
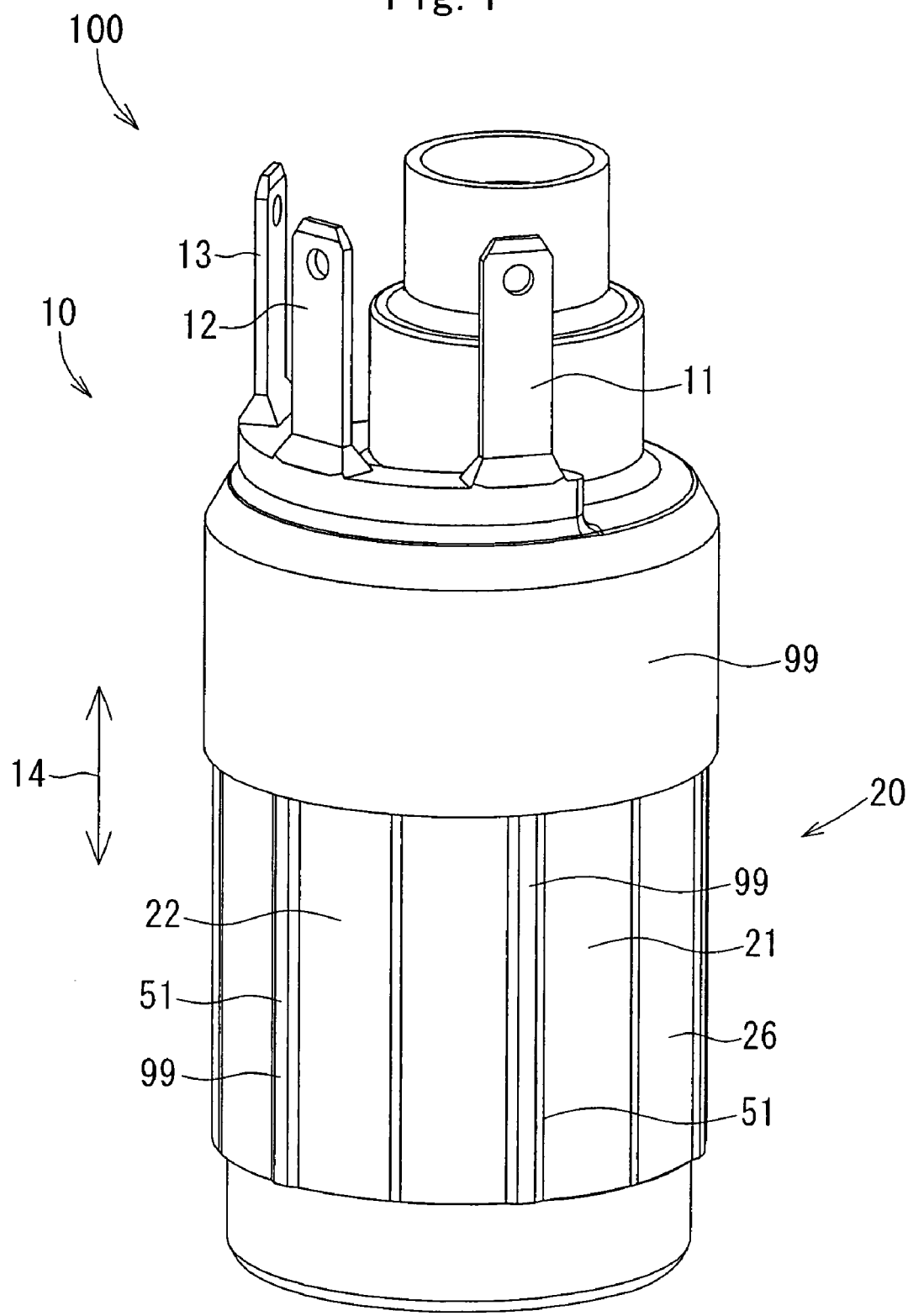
FIG. 1 is a perspective view showing a stator 10 according to the present embodiment.

The joined core 105 (see FIG. 2) includes the end insulators 71 to 76 and the split cores 21 to 26 arranged like a circle. The stator 10 is obtained by molding the joined core 105 with the mold resin 99. Since the openings of the storage grooves 61 to 64 along the outer surface 58 are covered with the mold resin 99, the bridge lines 17 to 19 placed in the storage groove 61 to 64 are protected by the mold resin 99 in an insulation manner. Thereby, the damage of the bridge lines 17 to 19 can be prevented. Further, as shown in FIG. 1, the engagement grooves 51 also are filled with the mold resin 99. Thus, since the mold resin 99 supports the split cores 21 to 26 from the outer surface 49 side, the split cores 21 to 26 can be joined firmly.

A support member 110 supports the split cores 21 to 26 that engage with the jigs 70. The support member 110 is used for continuously winding the coils 31 and 34, the coils 32 and 35 and the coils 33 and 36 around the respective teeth 38 of the split cores 21 to 26. With the use of this support member 110, the split cores 21 to 26 can assume the state where their respective teeth 38 face outward.

The stator 10 according to the present embodiment is manufactured as follows. Firstly, as shown in FIG. 3, the first insulator 53 and the second insulator 54 are fixed to each of the teeth 38 of the split cores 21 to 26. Thereby, the teeth 38 of the split core 21 to 26 are insulation-covered with the end insulators 71 to 76, respectively. Each of the end insulators 71 to 76 includes an insertion portion 47 (see FIG. 3). The external terminals 11 to 13 (see FIG. 4) or the internal terminals 86 to 88 (see FIG. 5) are fixed to the insertion portions 47 of the end insulators 71 to 76, respectively. Thereby, the split cores 21 to 26 with the end insulators 71 to 76 attached thereto, respectively, can be obtained.

Next, the split cores 21 to 26 are made to engage with the jigs 70, respectively, which are attached to the support member 110. More specifically, the convex portion of each jig 70 is allowed to enter into the engagement groove 51 via the opening 43 of each split core 21 to 26 (see FIG. 8), whereby each split core 21 to 26 is fixed to the jig 70. Thereby, the split cores 21 to 26 are arranged along a circle so that their teeth 38 face outward (see FIG. 11). When the split cores 21 to 26 are viewed from the outer surface 49 side (see FIG. 8), the split core 22 is located on the left side of the split core 21, the split core 23 is located on the left side of the split core 22, the split core 24 is located on the left side of the split core 23, the split core 25 is located on the left side of the split core 24, and the split core 26 is located on the left side of the split core 25.

Coils 31 to 36 are wound around their teeth 38 with respect to the split cores 21 to 26 with their teeth 38 facing outward. One end of a copper wire as the winding-start is fixed to the external terminal 11 (see FIG. 11) of the split core 21, and the copper wire is wound around the tooth 38 of the split core 21 (see FIG. 3) to form the coil 31. After the formation of the coil 31, the copper wire is guided to the split core 24 side through the second outlet 56 of the split core 21 as the bridge line 17. Then, the bridge line 17 is introduced from the outer surface 58 side of the split core 24 to the tooth 38 side through the first outlet of the split core 24, and is wound around the tooth 38 thereof. Thereby, the coil 34 is formed at the tooth 38 of the split core 24. The copper wire of the coil 34 at the winding-end is connected with the internal terminal 86 of the split core 24. In this way, the coils 31 and 34 are continuously wound using one copper wire around the teeth 38 of the split core 21 and the split core 24, respectively, from the outside of their end insulators 71 and 74 (see FIG. 11). Similarly, the bridge line 18 having a predetermined length is formed between the split cores 22 and 25 and the coils 32 and 35 are continuously wound using one copper wire from the outside of the end insulators 72 and 75. Further, the bridge line 19 having a predetermined length is formed between the split cores 23 and 26 and the coils 33 and 36 are continuously wound using one copper wire from the outside of the end insulators 73 and 76.

Subsequently, the split cores 21 to 26 with the coils 31 to 36 formed therein, as well as the jigs 70, are detached from the support member 110. Then, the split cores 21 to 26 are arranged in a cylindrical shape so that their teeth 38 face inward (see FIG. 11 and FIG. 12). FIG. 12 shows the progress where the attitude of the split cores 21 to 26 is changed to the cylindrical shape from the state where their teeth 38 face outward. During this progress, the bridge lines 17 to 19 are placed in the corresponding storage grooves 61 to 64. That is, as shown FIG. 10 and FIG. 12, the bridge line 17 is placed in the storage groove 61 of the split core 21, the storage groove 62 of the split core 22, the storage groove 63 of the split core 23 and the storage groove 64 of the split core 24. The bridge line 18 is placed in the storage groove 61 of the split core 22, the storage groove 62 of the split core 23, the storage groove 63 of the split core 24 and the storage groove 64 of the split core 25. The bridge line 19 is placed in the storage groove 61 of the split core 23, the storage groove 62 of the split core 24, the storage groove 63 of the split core 25 and the storage groove 64 of the split core 26. In this way, the bridge lines 17 to 19 are placed in the storage grooves 61 to 64, respectively, in a mutually non-contact manner.

After the split cores 21 to 26 are arranged in a cylindrical shape, the internal terminals 86 to 88 are short-circuited using the short member 37 (see FIG. 2). The short member 37 has three connection parts 134 corresponding to upper end portions 94 of the internal terminals 86 to 88, respectively (see FIG. 2). Each connection part 134 is deformed so that a part of the short member 37 has a substantially U-shape in a plan view. Thereby, each connection part 134 has a space capable of accommodating the corresponding upper end portion 94 therein. Each of the connection portions 134 of the short member 37 is attached to each upper end portions 94 of the internal termination 86 to 88, whereby the internal terminals 86 to 88 are connected electrically to form the neutral point N. Thereby, the joined core 105 can be obtained (see FIG. 2).

Finally, the joined core 105 is molded with resin (see FIG. 1 and FIG. 2). More specifically, the joined core 105 is placed in a predetermined die. In this state, the mold resin 99 to be in a fluid state by heating is injected into the die, thus molding the mold resin 99. At this time, the storage grooves 61 to 64 of the end insulators 71 to 76 are molded, and the engagement grooves 51 of the split cores 21 to 26 are filled with the mold resin 99 (see FIG. 1). Thereby, the stator 10 can be obtained.

As described above, the bridge lines 17 to 19 of the coils 31 to 36 are placed in and held by the storage grooves 61 to 64. This can prevent effectively the damage of the bridge lines 17 to 19 or the short resulting from the contact of the bridge lines 17 to 19 during the molding of the stator 10. Further, since the storage grooves 61 to 64 are molded, the bridge lines 17 to 19 can be insulation-protected by the mold resin 99. Moreover, since the engagement grooves 51 of the split cores 21 to 26 are filled with the resin, the split cores 21 to 26 can be supported by the mold resin 99 from the outside. Thus, the split cores 21 to 26 can be joined from the outside firmly. As a result, the stator 10 manufactured can be of high quality.

Since the outlet 56 is continuous with one storage groove 61, the bridge line can be led out from the tooth 38 side to the outer surface 49 side through the outlet 56, whereby the bridge line can be securely placed in the storage groove 61. In other words, this can prevent the bridge line to be placed in the storage groove 61 from being placed in the other storage grooves 62 to 64. Since the outlet 55 is continuous with all of the storage grooves 61 to 64, the bridge line placed in the lowermost storage groove 64 can be linearly wired from the outer surface 49 side to the teeth 38 side through the outlet 55. This can prevent the bridge line placed in the lowermost groove 64 from contacting with the bridge lines placed in the storage grooves 61 to 63 of upper stages.

Since the storage grooves 61 to 64 are aligned in the motor axis direction 14 in stages in number corresponding to the number of electrical phases to be formed by the coils 31 to 36, and the storage grooves 61 to 64 accommodate one bridge line in cooperation with the storage grooves 61 to 64 in a different number of stage of their adjacent end insulators 71 to 76, and therefore even in the case where split cores 21 to 26 with a common electrical phase sandwich split cores 21 to 26 with a different electrical phase, the bridge line as a whole can be placed in the storage grooves 61 to 64.

Since the storage grooves 61 to 64 that receive one bridge line are continuous linearly with the storage grooves 61 to 64 of the adjacent end insulators 71 to 76 that receive the bridge line in cooperation therewith, a load applied to the bridge lines during the molding can be reduced, thus preventing the damage and a break of the bridge lines.

Since the engagement grooves 51 are dovetail grooves, there is no need to use a magnet or the like as the jig 70. Therefore, the split cores 21 to 26 are not magnetized. Since the engagement grooves 51 are filled with the mold resin, the split cores 21 to 26 can be supported by the mold resin from the outside. Thus, the split cores 21 to 26 can be joined firmly.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A stator for an inner rotor type mold brushless motor, comprising:
   a plurality of split cores each corresponding to a tooth and arranged in a cylindrical shape;
   end insulators, each of which covers the tooth of each split core for insulation; and
   coils that are insulated from the split cores by the end insulators and are wound continuously around teeth of split cores forming a same electrical phase via a bridge line,
   wherein
   an outer surface of each split core is provided with openings at both ends of the split core in a motor axis direction, the openings communicating with each other, and an engagement groove that can engage with a jig that supports the split core, and
   each end insulator is provided with an outlet and storage grooves, the outlet leading the bridge line of each coil to an outer surface side of the end insulator and the storage grooves accommodating bridge lines of coils forming different electrical phases in a mutually non-contact manner.

2. The stator for an inner rotor type mold brushless motor according to claim 1, wherein at least two or more outlets are provided for each end insulator,
   wherein
   a first outlet is continuous with all of the storage grooves of the end insulator, and
   a second outlet is continuous with any one of the storage grooves of the end insulator.

3. The stator for an inner rotor type mold brushless motor according to claim 2, wherein the storage grooves are provided to be aligned in the motor axis direction in stages in number corresponding to the number of electrical phases to be formed by the coils, and each storage groove accommodates one bridge line in cooperation with a storage groove in a stage in a different number of an adjacent end insulator.

4. The stator for an inner rotor type mold brushless motor according to claim 3, wherein the storage groove accommodating one bridge line is linearly continuous with the storage groove of the adjacent end insulator that accommodates the bridge line in cooperation therewith.

5. The stator for an inner rotor type mold brushless motor according to claim 1, wherein the engagement groove is a dovetail groove.

6. The stator for an inner rotor type mold brushless motor according to claim 1, further comprising a mold resin that molds at least the storage grooves.

7. The stator for an inner rotor types mold brushless motor according to claim 6, wherein the mold resin is filled at least in the engagement grooves.

* * * * *